United States Patent
Hesslewood et al.

(10) Patent No.: US 12,503,234 B1
(45) Date of Patent: Dec. 23, 2025

(54) AIRCRAFT INTERIOR MONUMENT ENCLOSURE

(71) Applicant: The Boeing Company, Arlington, VA (US)

(72) Inventors: Sean Richard Hesslewood, Summerville, SC (US); Paul Thomas Bridgeman, Mount Pleasant, SC (US); Christopher Joseph Ruhner, Bothell, WA (US)

(73) Assignee: The Boeing Company, Arlington, VA (US)

( * ) Notice: Subject to any disclaimer, the term of this patent is extended or adjusted under 35 U.S.C. 154(b) by 0 days.

(21) Appl. No.: 18/752,127

(22) Filed: Jun. 24, 2024

(51) Int. Cl.
*B64D 11/04* (2006.01)

(52) U.S. Cl.
CPC .................... *B64D 11/04* (2013.01)

(58) Field of Classification Search
CPC .................... B64D 11/04; B64C 1/10
See application file for complete search history.

(56) References Cited

U.S. PATENT DOCUMENTS

| | | | |
|---|---|---|---|
| 10,029,795 B2 * | 7/2018 | Burd | B64D 11/0007 |
| 2006/0124802 A1 * | 6/2006 | Ritts | B64D 11/00 244/118.5 |
| 2012/0217343 A1 * | 8/2012 | Koschberg | B64D 11/04 29/469 |
| 2014/0367220 A1 * | 12/2014 | Lange | B64D 11/04 198/347.2 |
| 2017/0291725 A1 * | 10/2017 | Abelon | B64F 5/50 |

* cited by examiner

*Primary Examiner* — Joshua J Michener
*Assistant Examiner* — Cindi M Curry
(74) *Attorney, Agent, or Firm* — Yee & Associates, P.C.

(57) ABSTRACT

A monument assembly for a vehicle and method for attaching a monument assembly to an aircraft. The monument assembly is capable of being a heavily loaded interior monument enclosure for an aircraft that includes a load bearing structural frame to be attached to a floor of the aircraft. The monument assembly includes a plurality of support members connected together and a set of floor fittings connected to the plurality of support members. The set of floor fittings configured to be connected to the vehicle. A plurality of non-loadbearing panels is connected to the plurality of support members. A load path of the monument assembly is carried by the plurality of support members and not the plurality of panels.

20 Claims, 6 Drawing Sheets

AIRCRAFT INTERIOR MONUMENT ENCLOSURE

BACKGROUND INFORMATION

1. Field

The present disclosure relates generally to aircraft. More specifically, the present disclosure relates to a heavily loaded interior monument enclosure for an aircraft including a load bearing structural frame configured to be attached to a floor of the aircraft.

2. Background

A typical use for monument enclosures on commercial aircraft is closets, storage monuments, gallery cart enclosures, etc. Traditional designs of monument enclosures or monument assemblies use structural composite panels affixed to a frame where the composite panels are the main strengthening components and are used to react the loads imposed by the enclosure's contents during operation of the aircraft. The panels, not the frame, are connected to the cabin floor of the aircraft to secure the enclosure within the aircraft. This type of design is extremely inefficient and often requires the application of large, machined frames to support the structural panels. The large, machined frames are extremely expensive and heavy. Additionally, the structural panels are typically 1 inch thick aluminum honeycomb and aluminum skinned panels, which are also heavy and expensive.

Therefore, it would be desirable to have a method and apparatus that takes into account at least some of the issues discussed above, as well as other possible issues.

SUMMARY

An illustrative embodiment of the present disclosure provides a monument assembly for a vehicle. The monument assembly includes a plurality of support members and a set of floor fittings. The plurality of support members is connected together. The set of floor fittings are connected to the plurality of support members. The set of floor fittings are configured to be connected to the vehicle.

Another illustrative embodiment of the present disclosure provides an aircraft. The aircraft includes a fuselage, a floor of the fuselage, and an interior monument assembly. The interior monument assembly is configured to be connected to the floor.

A further illustrative embodiment of the present disclosure provides a method for attaching a monument assembly to an aircraft. A monument assembly is assembled. A frame of the monument assembly is connected to a floor of the aircraft The features and functions can be achieved independently in various embodiments of the present disclosure or may be combined in yet other embodiments in which further details can be seen with reference to the following description and drawings.

BRIEF DESCRIPTION OF THE DRAWINGS

The novel features believed characteristic of the illustrative embodiments are set forth in the appended claims. The illustrative embodiments, however, as well as a preferred mode of use, further objectives and features thereof, will best be understood by reference to the following detailed description of an illustrative embodiment of the present disclosure when read in conjunction with the accompanying drawings, wherein:

DETAILED DESCRIPTION

The illustrative embodiments recognize and take into account a number of different issues with respect to aircraft that incorporate heavily loaded interior monument enclosures. The issues recognized by the different illustrative embodiments are described herein.

The illustrative embodiments recognize and take into account that traditional design of monument enclosures uses structural composite panels to react the loads imposed by the enclosure's contents during operation of the aircraft.

The illustrative embodiments recognize and take into account that the panels structural composite panels of traditional monument enclosures or assemblies are connected to the cabin floor of the aircraft to secure the enclosure within the aircraft and that this type of design is extremely inefficient and often requires the application of large, machined frames to support the structural panels.

The illustrative embodiments recognize and take into account that the large, machined frames are typically constructed of expensive materials and are heavy. Additionally, the structural panels are typically also heavy and expensive.

In these illustrative examples, support members are connected together to form a load bearing frame of a monument assembly. The frame is configured to be connected to a floor of an aircraft. Loads applied to the monument assembly are carried by the frame and not panels connected to the frame. As a result, the monument assembly can be fabricated with common extrusions more efficiently with less expensive materials and can be customized to specific applications.

Figure 1:
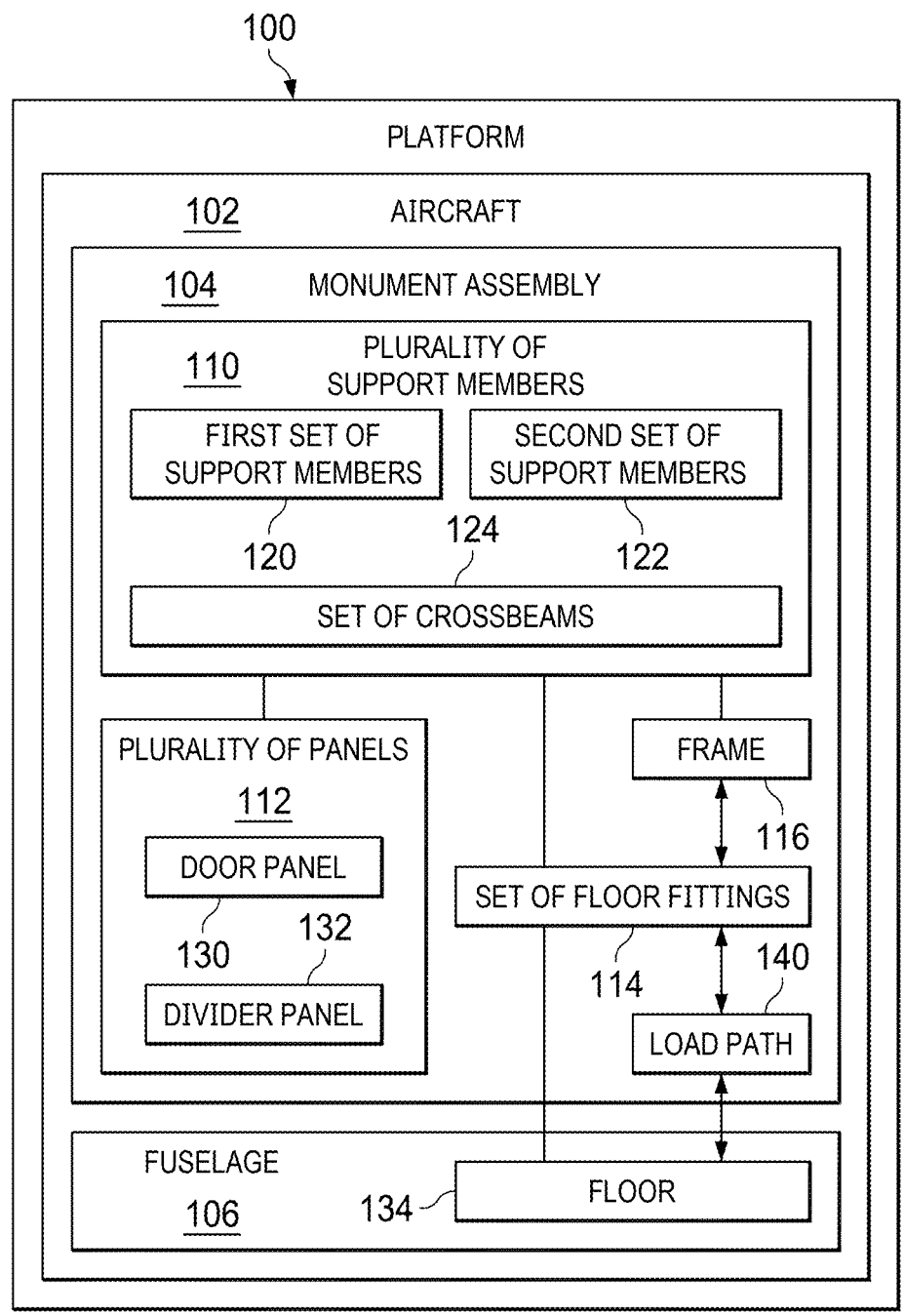
FIG. 1 is an illustration of a block diagram of a platform in accordance with an illustrative embodiment.

With reference now to the figures and, in particular, with reference to FIG. 1, an illustration of a block diagram of a platform is depicted in accordance with an illustrative example. Platform 100 has aircraft 102 in this illustrative example.

The illustration of aircraft 102 in FIG. 1 is not meant to imply physical or architectural limitations to the manner in which an illustrative example may be implemented. For example, although aircraft 102 may be a commercial aircraft, aircraft 102 may be a military aircraft, a rotorcraft, a helicopter, an unmanned aerial vehicle, or any other suitable aircraft.

Although the illustrative examples are described with respect to an aircraft, the illustrative example may be applied to other types of platforms. The platform may be, for example, a mobile platform, a stationary platform, a land-based structure, an aquatic-based structure, or a space-based structure. More specifically, the platform may be an aircraft, a surface ship, a tank, a personnel carrier, a train, a spacecraft, a space station, a satellite, a submarine, an automobile, a power plant, a bridge, a dam, a house, a manufacturing facility, a building, a tool, a mechanical structure, or some other suitable platform or structure where a monument assembly is desirable.

In this illustrative example, platform 100 takes the form of aircraft 102. In this illustrative example, when platform 100 takes the form of aircraft 102, aircraft 102 includes monument assembly 104 and fuselage 106.

Monument assembly 104 includes plurality of support members 110, plurality of panels 112, and set of floor fittings 114. Plurality of panels 112 is connected to plurality of support members 110. Set of floor fittings 114 is connected to plurality of support members 110.

As used herein, a first component "connected to" or "coupled to" or "associated with" a second component means that the first component can be connected directly or indirectly to the second component. The connection is a physical association. In other words, additional components may be present between the first component and the second component. The first component is considered to be indirectly connected to the second component when one or more additional components are present between the two components. When the first component is directly connected to the second component, no additional components are present between the two components.

For example, a first component can be considered to be physically connected to a second component by at least one of being secured to the second component, bonded to the second component, mounted to the second component, welded to the second component, fastened to the second component, or connected to the second component in some other suitable manner. The first component also can be connected to the second component using a third component. The first component can also be considered to be physically connected to the second component by being formed as part of the second component, an extension of the second component, or both.

As used herein, a "set of," when used with reference to items, means one or more items. For example, a "set of floor fittings" is one or more floor fittings.

As used herein, the phrase "at least one of," when used with a list of items, means different combinations of one or more of the listed items can be used, and only one of each item in the list may be needed. In other words, "at least one of" means any combination of items and number of items may be used from the list, but not all of the items in the list are required. The item can be a particular object, a thing, or a category.

For example, without limitation, "at least one of item A, item B, or item C" may include item A, item A and item B, or item B. This example also may include item A, item B, and item C or item B and item C. Of course, any combination of these items can be present. In some illustrative examples, "at least one of" can be, for example, without limitation, two of item A; one of item B; and ten of item C; four of item B and seven of item C; or other suitable combinations.

Plurality of support members 110 includes first set of support members 120. First set of support members 120 may be oriented as and generally referred to as a set of vertical support members. Plurality of support members 110 includes second set of support members 122. Second set of support members 122 may be oriented as and generally referred to as a set of horizontal support members. The terms "vertical" and "horizontal" are defined as their generally accepted definitions. However, as aircraft are dynamic structures and the directions of vertical and horizontal may be fluid, in this illustrative example, it is understood that first set of support members 120 and second set of support members 122 are generally orthogonal.

Plurality of support members 110 includes set of crossbeams 124. Plurality of support members 110 including first set of support members 120, second set of support members 122, and set of crossbeams 124 are connected together to form frame 116.

As monument assembly 104 is often used for containing items, as assembled, monument assembly 104, thus frame 116, has a three-dimensional shape that defines an interior. The three-dimensional shape of monument assembly 104 is not limited to any particular shape. Intended use of monument assembly 104 and location of monument assembly 104 affect the shape of monument assembly 104. In this illustrative example, monument assembly 104 has a hexahedron shape. Frame 116 is a framework of extrusions tied together with gussets and shear plates to react the loads acting on monument assembly 104. Plurality of panels 112 is connected to plurality of support members 110. In other words, it can be said that plurality of panels 112 is connected to frame 116. Plurality of panels 112, when connected to frame 116, form an exterior surface of monument assembly 104. Plurality of panels 112 are non-loadbearing and are constructed of much lighter materials than those used with traditional monument assemblies that are required to bear loads.

In addition to forming the exterior surfaces of monument assembly 104, plurality of panels 112 includes door panel 130 and divider panel 132. Door panel 130 is connected to an end of frame 116. Door panel 130 is hinged for pivotal movement relative to frame 116. Door panel 130 allows a user access to an interior of monument assembly 104. Divider panel 132 separates compartments within the interior of monument assembly 104. Divider panel 132 is connected to two opposing sides of frame 116.

Set of floor fittings 114 is connected to plurality of support members 110. In other words, it can be said that set of floor fittings 114 is connected to frame 116. Each floor fitting of set of floor fittings 114 is hardware that connects frame 116 to structural components of floor 134. In other words, set of floor fittings 114 anchors monument assembly 104 to floor 134 of fuselage 106.

Fuselage 106 of aircraft 102 includes floor 134. Floor 134 is a lower, generally horizontally oriented surface of the interior of aircraft 102. Floor 134 can be part of a passenger cabin, a lavatory monument, a galley, a flight attendant area, etc. Floor 134 is generally what passengers and crew walk on and what monument assembly 104 is supported by. Monument assembly 104 is connected to floor 134 via set of floor fittings 114. In other words, plurality of support members 110 connected together form frame 116, set of floor fittings 114 is connected to frame 116, and set of floor fittings 114 is connected to floor 134. Floor 134 may have structural components that floor fittings 114 are anchored to.

An important aspect of monument assembly 104 is load path 140. In contrast to traditional monument assemblies with heavy structural panels, monument assembly 104 carries load path 140 in plurality of support members 110 and set of floor fittings 114 through to floor 134. In other words, when a force is applied to monument assembly 104, from the exterior or from the contents in the interior, monument assembly 104 reacts load path 140 with plurality of support members 110 and set of floor fittings 114 through to floor 134. Plurality of panels 112 are not considered load bearing in support of the primary load path of monument assembly 104 as they would be with a traditional monument assembly where structural panels are considered the primary load bearing members.

Figure 2:
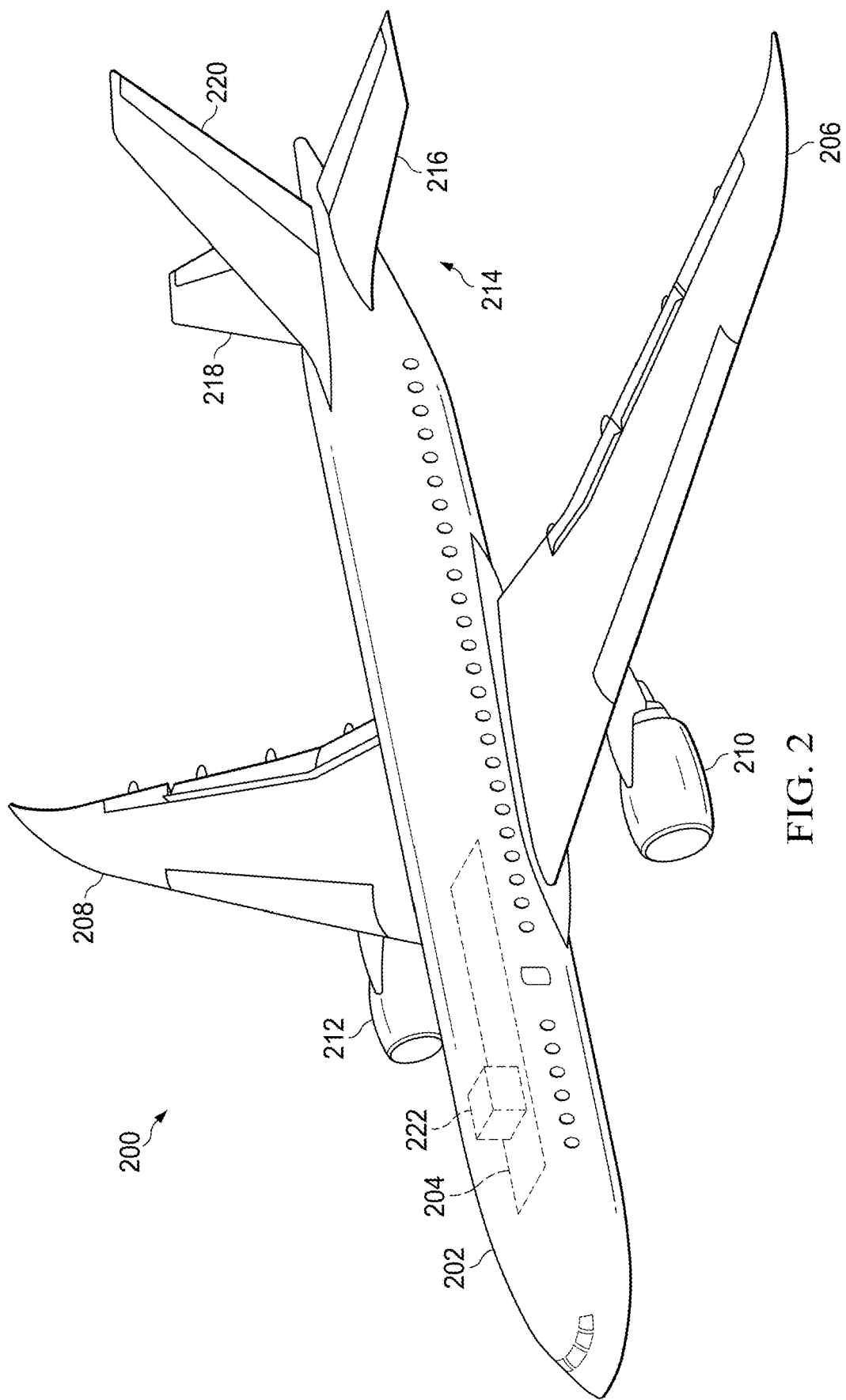
FIG. 2 is an illustration of an aircraft with a monument assembly in accordance with an illustrative embodiment.

With reference next to FIG. 2, an illustration of an aircraft with a monument assembly is depicted in accordance with an illustrative embodiment. In this illustrative example and the illustrative examples that follow, the same reference numeral may be used in more than one figure. This reuse of a reference numeral in different figures represents the same element in the different figures. The components illustrated in FIG. 2 are examples of physical implementations of aircraft 102, monument assembly 104, fuselage 106, and floor 134 shown in block form in FIG. 1.

As illustrated, aircraft 200 includes fuselage 202. Fuselage includes floor 204. Aircraft 200 has wing 206 and wing 208 connected to fuselage 202. Aircraft 200 includes engine 210 connected to wing 206. Aircraft 200 includes engine 212 connected to wing 208. Fuselage 202 has tail section 214. Horizontal stabilizer 216, horizontal stabilizer 218, and vertical stabilizer 220 are connected to tail section 214 of fuselage 202. Monument assembly 222 is connected to floor 204 of fuselage 202.

Aircraft 200 is an example of an aircraft with a monument assembly as disclosed herein. Monument assembly 222, as disclosed herein, may be retrofitted to fuselage 202 in place of a traditional monument assembly having heavy, structural panels. Or aircraft 200 including fuselage 202 may be fabricated from the start with monument assembly 222 having a plurality of support members forming a frame, where the frame is connected to floor 204. A monument assembly 222 having a plurality of support members connected together to form a frame that is connected to a floor of a fuselage of an aircraft has a load path that is carried in the frame to the floor. Monument assembly 222 can be fabricated with common extrusions more efficiently with less expensive materials and can be customized to specific applications.

Figure 3:
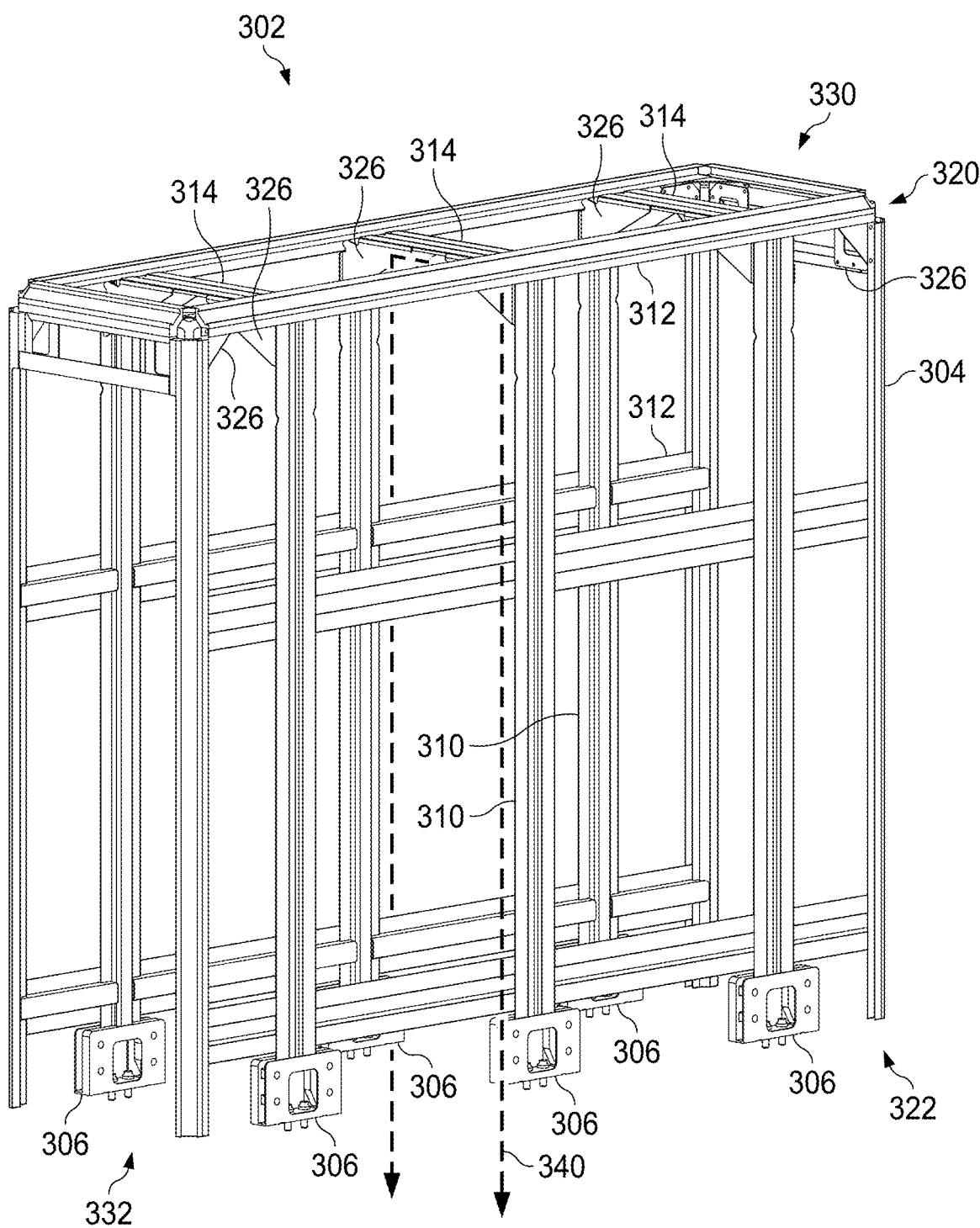
FIG. 3 is an illustration of a monument assembly frame in accordance with an illustrative embodiment.

With reference next to FIG. 3, an illustration of a plurality of support beams connected together to form a frame of a monument assembly in accordance with an illustrative example. The components illustrated in FIG. 3 are examples of physical implementations of set of floor fittings 114 and plurality of support members 110 forming frame 116 shown in block form in FIG. 1. Plurality of support members 302 are connected together to form frame 304. Plurality of support members 302 are connected to a floor of a fuselage with set of floor fittings 306.

Plurality of support members 302 includes first set of support members 310. First set of support members 310 are oriented vertically. As a result, first set of support members 310 may be a set of vertical support members. Plurality of support members 302 includes second set of support members 312. Second set of support members 312 are oriented horizontally. As a result, second set of support members 312 may be a set of horizontal support members. The terms vertical and horizontal are defined as their generally accepted definitions. However, it is understood that, in general, first set of support members 310 and second set of support members 312 are orthogonal to each other.

Plurality of support members 302 includes set of crossbeams 314. Plurality of support members 302 including first set of support members 310, second set of support members 312, and set of crossbeams 314 are connected together to form frame 304.

In this illustrative example, frame 304 of the monument assembly has a three-dimensional shape that defines an interior. The three-dimensional shape of frame 304 is not limited to any particular shape. The intended use and location of the monument assembly affects the shape of frame 304 of the monument assembly. In this illustrative example, frame 304 is six-sided, thus has a hexahedron shape.

Set of crossbeams 314 are connected to end 320 of first set of support members 310. Set of floor fittings 306 are connected to end 322 of first set of support members 310. End 320 is opposite end 322 along each vertical support member of first set of support members 310. Gussets 326 connect each support member of first set of support members 310 to each crossbeam of set of crossbeams 314 at end 320. Set of crossbeams 314 connected to first set of support members 310 at end 320 form upper side 330 of frame 304. Lower side 332 of frame 304 is opposite upper side 330 of frame 304. In this illustrative example, lower side 332 of frame 304 remains open to the floor of the fuselage which frame 304 is connected to.

An important aspect of frame 304 of the monument assembly is load path 340. In contrast to traditional monument assemblies with heavy structural panels, frame 304 of the monument assembly carries load path 340 in plurality of support members 302 and set of floor fittings 306 through to the structural members of the floor the monument assembly is connected to. When a force is applied to the monument assembly, frame 304 of the monument assembly carries load path 340 with plurality of support members 302 and set of floor fittings 306 through to the floor.

Figure 4:
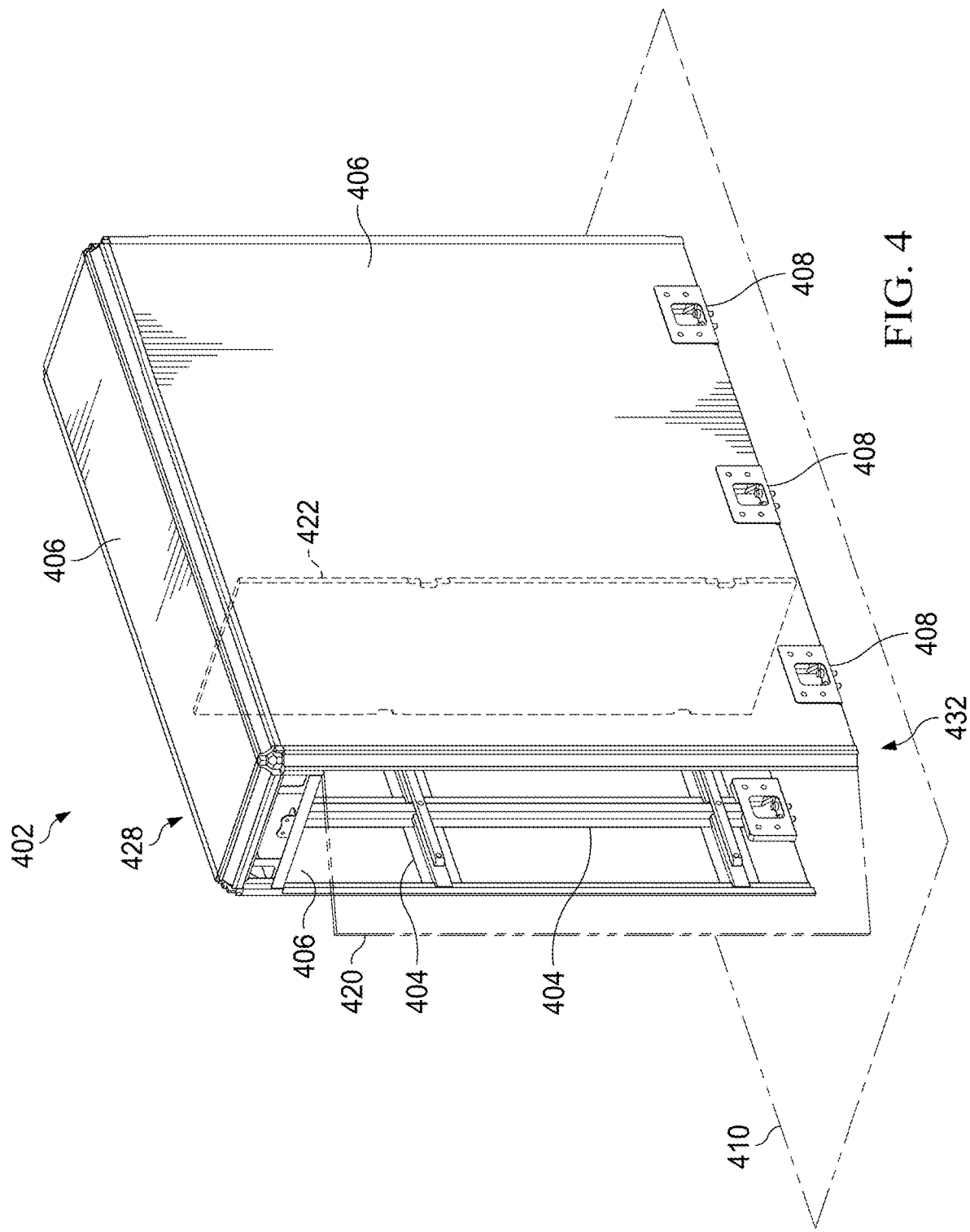
FIG. 4 is an illustration of a monument assembly in accordance with an illustrative embodiment.

With reference next to FIG. 4, an illustration of a monument assembly in accordance with an illustrative example. The components illustrated in FIG. 4 are examples of physical implementations of monument assembly 104, plurality of support member 110, plurality of panels 112, and set of floor fittings 114 shown in block form in FIG. 1. Plurality of support members 404 is connected together. Plurality of panels 406 is connected to plurality of support members 404. Plurality of support members 404, via set of floor fittings 408, is connected to floor 410 of a fuselage.

Plurality of panels 406 form an exterior surface of monument assembly 402.

In addition to forming the exterior surfaces of monument assembly 402, plurality of panels 406 includes door panel 420 and divider panel 422. Door panel 420 is connected to end 428 of monument assembly 402. Door panel 420 is hinged for pivotal movement relative to plurality of support members 404. Door panel 420 allows a user access to an interior of monument assembly 402. Divider panel 422 separates compartments within the interior of monument assembly 402. It is important to note that plurality of panels 406 is not included in load path 340 (FIG. 3). Plurality of panels 406 are non-loadbearing and are constructed of much lighter materials than those used with traditional monument assemblies that are required to bear loads.

Lower side 432 of monument assembly 402 may remain open to floor 410 of the fuselage which plurality of support members 404 is connected to. The open lower side allows for ingress/egress of a rolling of a cart into and out monument assembly 402 should the intended use monument assembly 402 be a beverage cart garage. Lower side 432 may also include a panel of plurality of panels 406 should the intended use of monument assembly 402 require a closed lower side 432.

Figure 5:
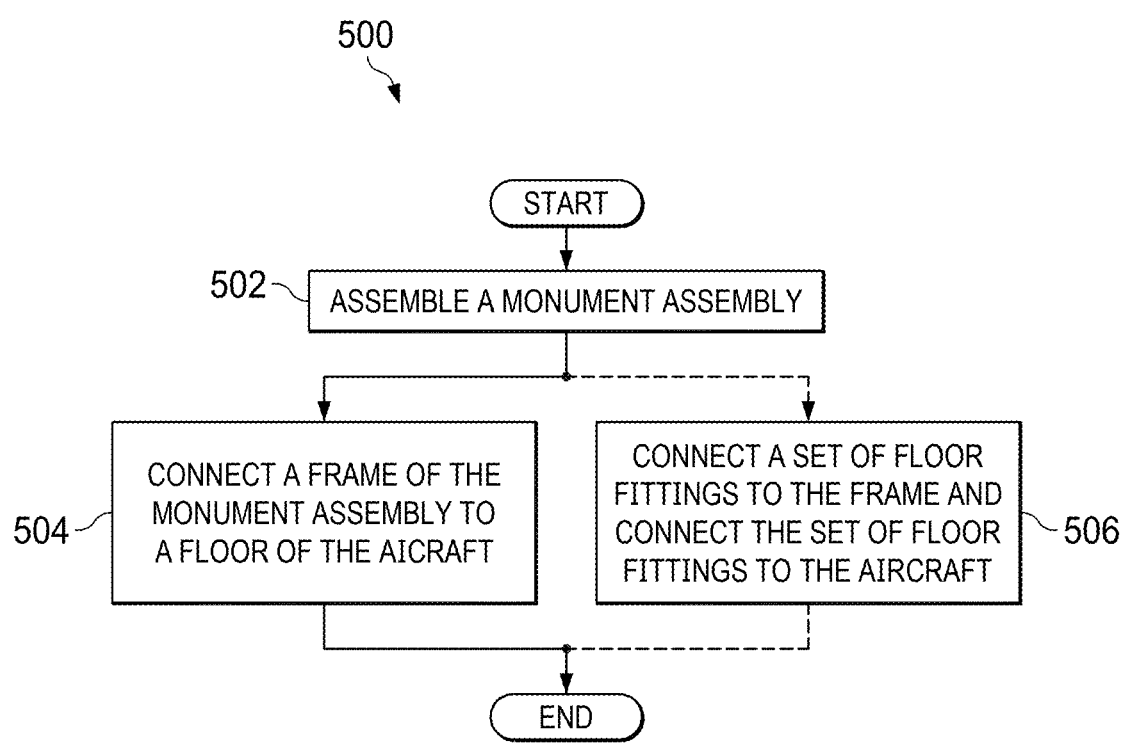
FIG. 5 is an illustration of a flowchart of a process for attaching a monument assembly to an aircraft in accordance with an illustrative embodiment.

With reference next to FIG. 5, an illustration of a flowchart of a process 500 for attaching a monument assembly to an aircraft is depicted in accordance with an illustrative embodiment. The method depicted in FIG. 5 may be used in conjunction with the monument assembly depicted in FIGS. 1-4.

The process begins by assembling a monument assembly (operation 502). Assembling the monument assembly includes connecting a first set of support members to a second set of support members and connecting a set of crossbeams to the first set of support members to form a frame and connecting a set of floor fittings to the frame at an end opposite the set of crossbeams. The process continues by connecting the frame of the monument assembly to a floor of the aircraft (operation 504). At operation 506, the process clarifies the connecting the frame of the monument assembly to the floor of the aircraft by connecting a set of floor fittings to the frame and connecting the set of floor fittings to the floor of the aircraft.

In some alternative implementations of an illustrative example, the function or functions noted in the blocks may not be necessary or may occur out of the order noted in the figures. For example, in some cases, two blocks shown in succession may be performed substantially concurrently, or the blocks may sometimes be performed in the reverse order, depending upon the functionality involved. Also, other blocks may be added in addition to the illustrated blocks in a flowchart or block diagram.

Figure 6:
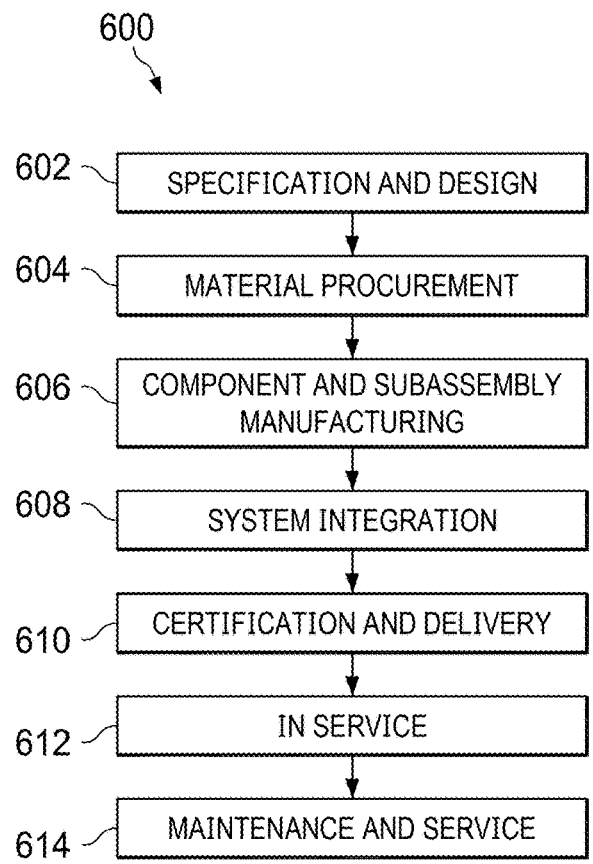
FIG. 6 is an illustration of an aircraft manufacturing and service method in accordance with an illustrative embodiment.
Figure 7:
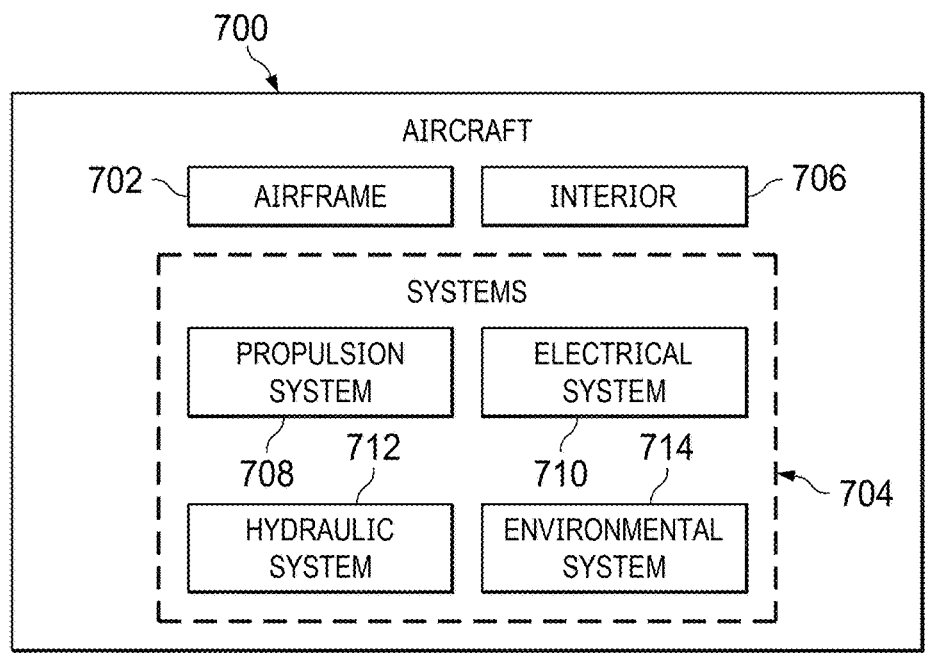
FIG. 7 is an illustration of a block diagram of an aircraft in which an illustrative embodiment may be implemented.

The illustrative embodiments of the disclosure may be further described in the context of aircraft manufacturing and service method 600 as shown in FIG. 6 and aircraft 700 as shown in FIG. 7. Turning first to FIG. 6, an illustration of a block diagram of an aircraft manufacturing and service method is depicted in accordance with an illustrative embodiment. During pre-production, aircraft manufacturing and service method 600 may include specification and design 602 of aircraft 700 in FIG. 7 and material procurement 604.

During production, component and subassembly manufacturing 606 and system integration 608 of aircraft 700 in FIG. 7 takes place. Thereafter, aircraft 700 in FIG. 7 may go through certification and delivery 610 in order to be placed in service 612. While in service 612 by a customer, aircraft 700 in FIG. 7 is scheduled for routine maintenance and service 614, which may include modification, reconfiguration, refurbishment, and other maintenance, service, or inspection.

Monument assembly 104 may be installed on an aircraft during component and subassembly manufacturing 606. In addition, monument assembly 104 may be retrofitted onto aircraft 700 in FIG. 7 during routine maintenance and service 614 as part of a modification, reconfiguration, or refurbishment of aircraft 700 in FIG. 7.

Each of the processes of aircraft manufacturing and service method 600 may be performed or carried out by a system integrator, a third party, an operator, or some combination thereof. In these examples, the operator may be a customer. For the purposes of this description, a system integrator may include, without limitation, any number of aircraft manufacturers and major-system subcontractors; a third party may include, without limitation, any number of vendors, subcontractors, and suppliers, and an operator may be an airline, a leasing company, a military entity, a service organization, and so on.

With reference now to FIG. 7, an illustration of a block diagram of an aircraft is depicted in which an illustrative embodiment may be implemented. In this example, aircraft 700 is produced by aircraft manufacturing and service method 600 in FIG. 6 and may include airframe 702 with plurality of systems 704 and interior 706. Examples of systems 704 include one or more of propulsion system 708, electrical system 710, hydraulic system 712, and environmental system 714. Any number of other systems may be included. Although an aerospace example is shown, different illustrative embodiments may be applied to other industries, such as the automotive industry.

Apparatuses and methods embodied herein may be employed during at least one of the stages of aircraft manufacturing and service method 600 in FIG. 6. In one illustrative example, components or subassemblies produced in component and subassembly manufacturing 606 in FIG. 6 may be fabricated or manufactured in a manner similar to components or subassemblies produced while aircraft 700 is in service 612 in FIG. 6. As yet another example, one or more apparatus embodiments, method embodiments, or a combination thereof may be utilized during production stages, such as component and subassembly manufacturing 606 and system integration 608 in FIG. 6. One or more apparatus embodiments, method embodiments, or a combination thereof may be utilized while aircraft 700 is in service 612, during maintenance and service 614, inclusive of inspection, in FIG. 6, or both. The use of a number of the different illustrative embodiments may substantially expedite the assembly of aircraft 700, reduce the cost of aircraft 700, or both expedite the assembly of aircraft 700 and reduce the cost of aircraft 700.

The description of the different illustrative embodiments has been presented for purposes of illustration and description, and is not intended to be exhaustive or limited to the embodiments in the form disclosed. Many modifications and variations will be apparent to those of ordinary skill in the art. Further, different illustrative embodiments may provide different features as compared to other desirable embodiments. The embodiment or embodiments selected are chosen and described in order to best explain the principles of the embodiments, the practical application, and to enable others of ordinary skill in the art to understand the disclosure for various embodiments with various modifications as are suited to the particular use contemplated.

What is claimed is:

1. A monument assembly for an aircraft, comprising:
   a plurality of support members connected together forming a fixed, three-dimensional shaped frame; and
   a set of floor fittings connected to the plurality of support members, the set of floor fittings configured to be connected to the aircraft;
   wherein the plurality of support members comprises:
   a first set of support members;
   a second set of support members connected to the first set of support members;
   a set of crossbeams connected to a first end of the first set of support members; and
   wherein the set of floor fittings are connected to a second end of the first set of support members, the second end opposite the first end.

2. The monument assembly of claim 1, wherein the first set of support members are a set of vertical supports and the second set of support members are a set of horizontal supports and wherein a single vertical support member is positioned at each corner of the frame.

3. The monument assembly of claim 1, wherein a load path of the monument assembly is carried both horizontally and vertically by the plurality of support members when a force is applied to the monument assembly.

4. The monument assembly of claim 1, wherein the plurality of support members connected together form the frame having a hexahedron shape.

5. The monument assembly of claim 1, wherein a plurality of panels is connected to the plurality of support members.

6. The monument assembly of claim 5, wherein each panel of the plurality of panels is non-loadbearing.

7. The monument assembly of claim 4, wherein a door panel is connected to an end of the frame.

8. The monument assembly of claim 1, wherein the first set of support members are a set of vertical supports and the second set of support members are a set of horizontal supports, and—wherein more than two vertical supports of the set of vertical supports are connected to each horizontal support of the set of horizontal supports.

9. The monument assembly of claim 1, wherein the first set of support members are a set of vertical supports and further comprising a gusset connected to a crossbeam of the set of crossbeams and a vertical support of the set of vertical supports.

10. The monument assembly of claim 4, further comprising a divider panel connected to two opposing sides of the frame.

11. The monument assembly of claim 4, wherein the set of crossbeams form an upper side of the frame and a panel is connected to the upper side, and wherein a lower side of the frame is an open side, the lower side opposite the upper side.

12. An aircraft, comprising:
a fuselage;
a floor of the fuselage; and
a monument assembly comprising a plurality of support members connected together forming a fixed, three-dimensional shaped frame, the frame configured to be connected to the floor;
wherein the plurality of support members comprises:
a first set of support members;
a second set of support members connected to the first set of support members;
a set of crossbeams connected to a first end of the first set of support members; and
wherein the frame is connected to the floor at a second end of the first set of support members, the second end opposite the first end.

13. The aircraft of claim 12, wherein
a load path of a force applied to the monument assembly is carried both horizontally and vertically in the frame to the floor.

14. The aircraft of claim 13, wherein a floor fitting is connected to the frame and the floor fitting is configured to be connected to the floor.

15. The aircraft of claim 13, wherein a door panel is connected to the frame.

16. The aircraft of claim 13, wherein each panel of the plurality of panels is non-loadbearing.

17. The aircraft of claim 13, wherein a set of crossbeams form an upper side of the frame and a panel is connected to the upper side, and wherein a lower side of the frame is an open side, the lower side opposite the upper side.

18. A method for attaching a monument assembly to an aircraft, comprising:
assembling a monument assembly by connecting a plurality of support members together to form a fixed, three-dimensional shaped frame, wherein the plurality of support members comprises a first set of support members connected to a second set of support members and a set of crossbeams connected to a first end of the first set of support members; and
connecting the frame of the monument assembly at a second end of the first set of support members to a floor of the aircraft, the second end opposite the first end.

19. The method of claim 18, wherein the connecting the frame of the monument assembly to the floor of the aircraft comprises connecting a plurality of floor fittings to the frame at the second end of the first set of support members and connecting the plurality of floor fittings to the floor of the aircraft.

20. The method of claim 18, wherein a load path of a force applied to the monument assembly is carried both horizontally and vertically in the frame to the floor.

\* \* \* \* \*